Dec. 8, 1964   A. L. BUSCH, JR   3,160,486
FLUID OPERATED TIMING APPARATUS
Filed April 24, 1962   4 Sheets-Sheet 1

Adolphus L. Busch, Inventor

Dec. 8, 1964   A. L. BUSCH, JR   3,160,486
FLUID OPERATED TIMING APPARATUS
Filed April 24, 1962   4 Sheets-Sheet 2

Adolphus L. Busch, Inventor

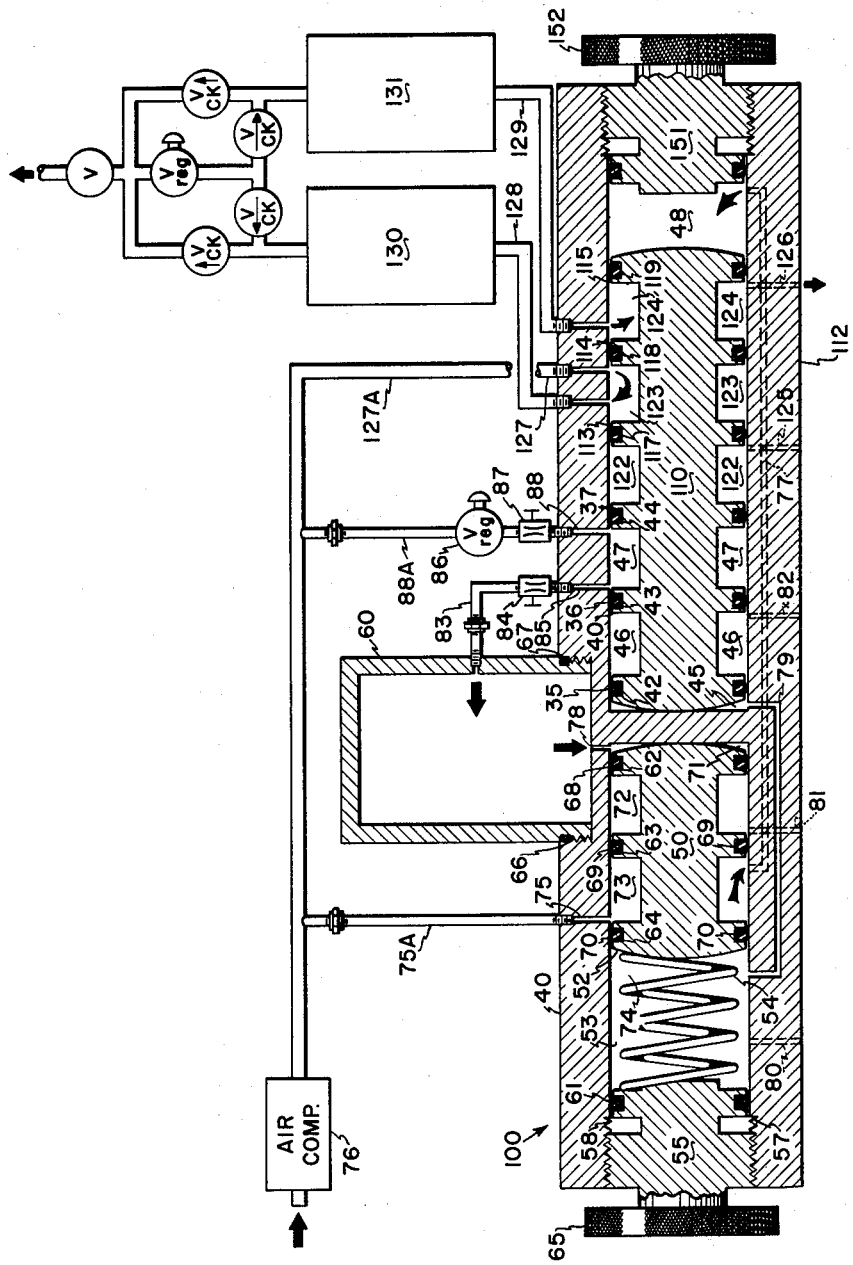

Dec. 8, 1964
A. L. BUSCH, JR
3,160,486
FLUID OPERATED TIMING APPARATUS
Filed April 24, 1962
4 Sheets-Sheet 4
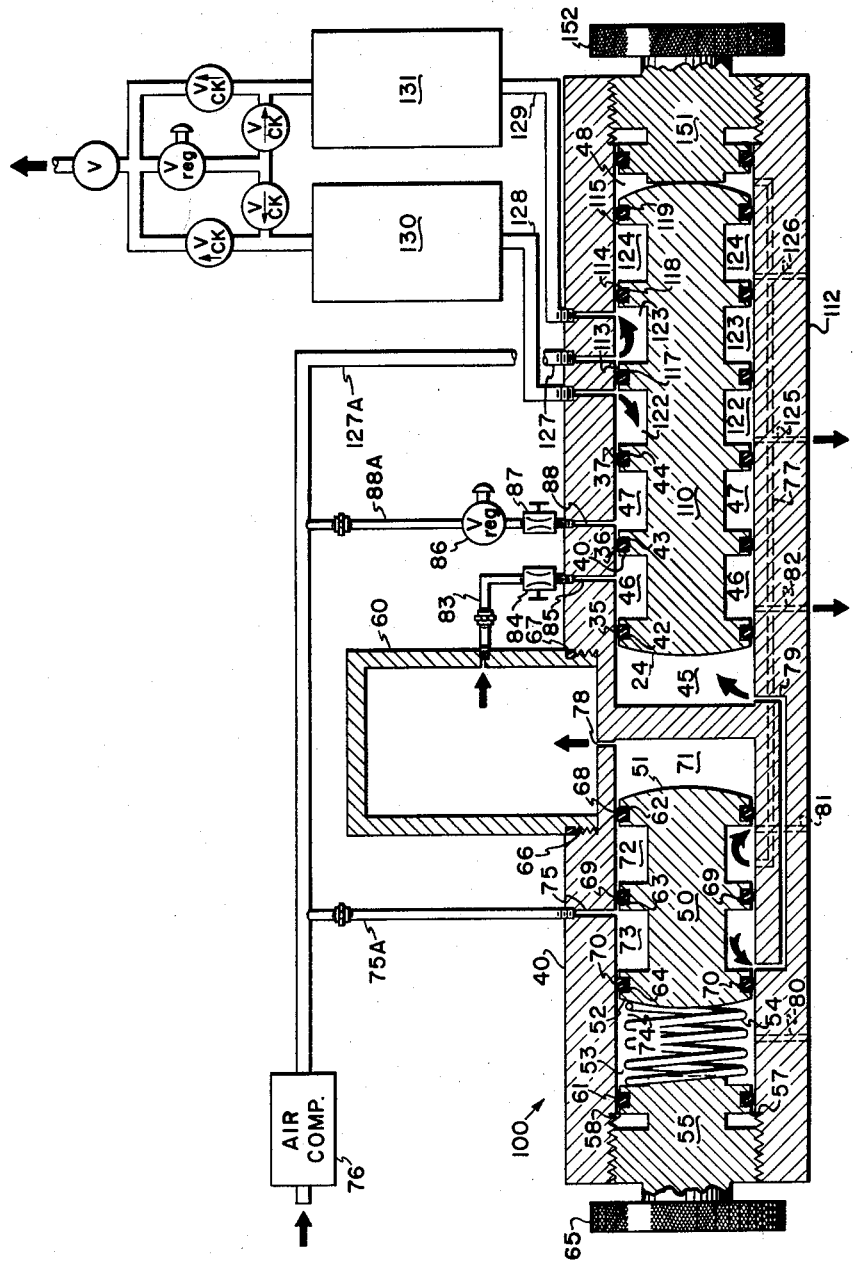
Adolphus L. Busch, Inventor

United States Patent Office

3,160,486
Patented Dec. 8, 1964

3,160,486
FLUID OPERATED TIMING APPARATUS
Adolphus L. Busch, Jr., Hampton, Bethlehem Township, Hunterdon County, N.J., assignor, by mesne assignments, to Gilbert & Barker Manufacturing Company, a corporation of Massachusetts
Filed Apr. 24, 1962, Ser. No. 189,921
22 Claims. (Cl. 55—162)

The present invention relates to a fluid operated timing apparatus. Particularly, the present invention relates to an apparatus adapted to provide mechanical and fluid action in a predetermined timed manner, which apparatus operates solely by the employment of a fluid medium. More particularly, the present invention relates to a pneumatically operated timing apparatus, which apparatus permits predetermined timed mechanical action or pneumatic flow directing action in an alternating and cyclic manner. Further, the apparatus of the present invention is of a nature allowing the rapid preselection, control and adjustment of the total cyclic period of operating or actuating time or of those internal or individual cyclic periods of actuating time making up the total cyclic period of actuating time or of both total and internal periods of time. Still omer particularly, the present invention relates to an air-operated timing apparatus, which apparatus effects external mechanical action or pneumatic action of a fluid flow directing means over a preselected total cyclic period of time as well as internal periods of time. Even more particularly, the timing apparatus of the present invention permits the cyclic operation, that is, the alternating opening and closing by external mechanical action, of fluid flow directing valves over a predetermined and preselected period of time. Further, the present invention relates to a timing apparatus capable of permitting the cyclic and alternating internal operation of a gaseous flow directing reciprocating piston means in a preselected timed manner. Even still more particularly, the present invention relates to a gas operated timing apparatus which permits either by external mechanical action on valve means or internal pneumatic action on gaseous flow directing means the predetermined alternating and cyclic introduction into and discharge of a gaseous stream from an apparatus for fractionating gaseous mixtures. Even more explicitly, the present invention relates to an air-operated timing apparatus adapted to open and close gaseous flow directing valve means in an alternating cyclic timed manner, thereby permitting the cyclic and alternating introduction of a gaseous feed stream at a relatively high pressure into one or more beds of adsorbent material, and the cyclic and alternating discharge of a secondary effluent gaseous stream from the adsorbent beds to a region of relatively low pressure. In an even narrower sense the present invention relates to a "heatless" fractionating apparatus for gaseous mixtures in combination with a gas-operated timing apparatus, which total apparatus operates solely by the relatively high pressure gaseous stream supplied to it for fractionating purposes.

Cyclic timed action of either an external mechanical or internal fluid flow directing character over predetermined periods of time is frequently required in the operation of various apparatuses. This is particularly true where fluids including both liquids and gases are required to be introduced into or withdrawn from vessels, accumulators, pipelines, storage tanks and other open or closed fluid containers in a cyclic and alternating manner by the operation of valves or other fluid flow directing or switching means. The rapid cyclic and alternating operation of fluid flow directing valve means in a predetermined timed manner is of particular importance in the rapid alternating introduction or discharge of a fluid stream into or from elongated vessels containing liquid, gaseous, solid or semisolid catalytic, absorbent, or adsorbent material. Of special importance in the fractionating of a gaseous mixture in vessels containing solid subdivided adsorbent material by the "heatless" fractionation method is the timed alternating and cyclic introduction into and discharge from the adsorbent vessels of a relatively high pressure feed stream of the mxture in question.

In the course of operation of the conventional apparatus required for "heatless" fractionation as shown by and described in U.S. Patent No. 2,944,627 to C. W. Skarstrom, issued July 12, 1960, the timed rapid and alternating introduction of the gaseous feed stream and the discharge of the gross secondary effluent is usually accomplished by electrically powered, solenoid-operated flow switching valves. Generally, the opening and closing of the valve means is accomplished in timed response to the electrical current flowing in a solenoid coil or coils. Thus, the sequential operation of the flow directing or flow switching valves is commonly effected by a mechanical or electrical timer, which may have either a preset, fixed timing cycle or a variable cycle time. These timing means commonly operate through an electricaly powered motor, which through a camshaft or other mechanism operates electrical switches or mechanically acting arms in a preselected timing sequence, which switches are connected to and electrically operate the solenoid means or coils, or which mechanically acting arms are directly connected to actuating means of the valve means, thereby effecting cyclic operation in the opening and closing of the valve means.

Although the employment of electrically powered and operated solenoid means has been proven generally satisfactory in the Skarstrom method and apparatus and in other apparatuses requiring timed cyclic and alternating action, the use of electrically powered means has limited potential. For example, the employment of electrically operated timing means is often precluded in atmospheres containing combustible vapors or dust wherein a danger of explosion exists. At the very least, the use of electrical timing means in these atmospheres requires special precautions and often complex safety shielding equipment to suppress electrical contact sparks and the other inherent explosive hazards of electrical timing mechanisms. Additionally, electrical timing means requires the presence of or connection with an available electrical power source. In certain locations electrical power sources or connective means are not readily or economically available, while pneumatic or fluid-operated sources of power are available. For example, diesel fuel, steam, or gasoline powered air compressors or liquid pumps which provide relatively high pressure fluids are commonly operated or frequently available even in remote areas having no direct access to sources of electrical power. The present discovery, therefore, permits the operation of a timing apparatus by fluid pressure sources such as steam, oil, or gas-powered pumps or compressors and the like without the need for electrical power.

It is, therefore, an object of this invention to provide a fluid operated, nonelectrical cyclic timing apparatus. Another object is to provide a timing apparatus for operation in atmospheres and areas of explosive tendencies which preclude the use of electrically powered timers or require special precautions for such timers. Another object is to provide a pneumatically operated timing apparatus permitting predetermined cyclic alternating timed mechanical action or internal fluid flow directing action in remote areas where electrical power is not readily available. A further object is to provide an air operated timing apparatus permitting the predetermined timed mechanical operation of valves or pneumatic flow directing means to control the cyclic and alternating flow of fluid streams. An additional object is to provide a pneumatically operated cyclic timing apparatus capable of rapid adjustment and control of both the total cyclic time period and the internal or individual cyclic time periods of the total period. Another object is to provide a gaseous fractionating apparatus wherein the sole source of operative power is derived from the relatively high pressure gaseous stream to be fractionated or a gaseous component thereof.

The present invention and its objects will be more fully understood and clearly perceived from the following description and claims read in conjunction with and with reference to the accompanying drawings in which:

FIGURE 4 is a sectional and schematic view of an internal fluid flow directing timing apparatus in combination with an external gaseous power operating and feed stream source, with the internal movable components of the timing apparatus in their positions at the start of the timing cycle, and showing the introduction of a gaseous mixture feed stream into a first adsorbent vessel and the venting of a second adsorbent vessel; and FIGURE 5 is a sectional and schematic view of an internal fluid flow directing timing apparatus in combination with an external gaseous power operating and feed stream source, with the internal movable components of the timing apparatus in their positions at the end of the first internal cycle period of time, and showing the introduction of a gaseous mixture feed stream into a second adsorbent vessel and the venting of a first adsorbent vessel.

*Mechanical Action Timing Apparatus*

Figure 1:
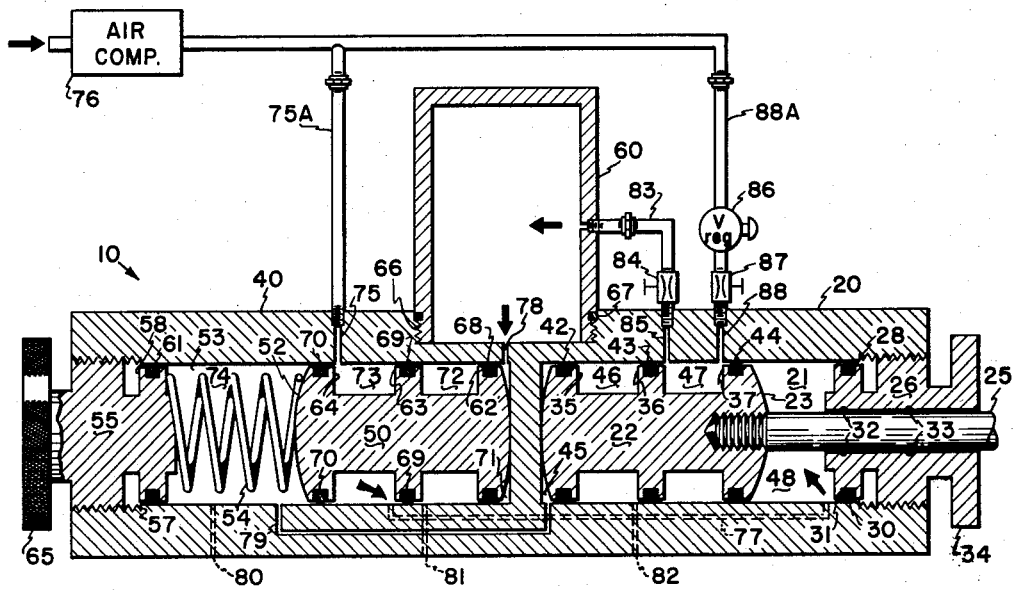
FIGURE 1 is a sectional and schematic view of an external mechanical rod action timing apparatus in combination with an external fluid power operating source, with the internal movable components of the timing apparatus in their positions at the start of the timing cycle, and showing the external operating rod in its retracted position.
Figure 2:
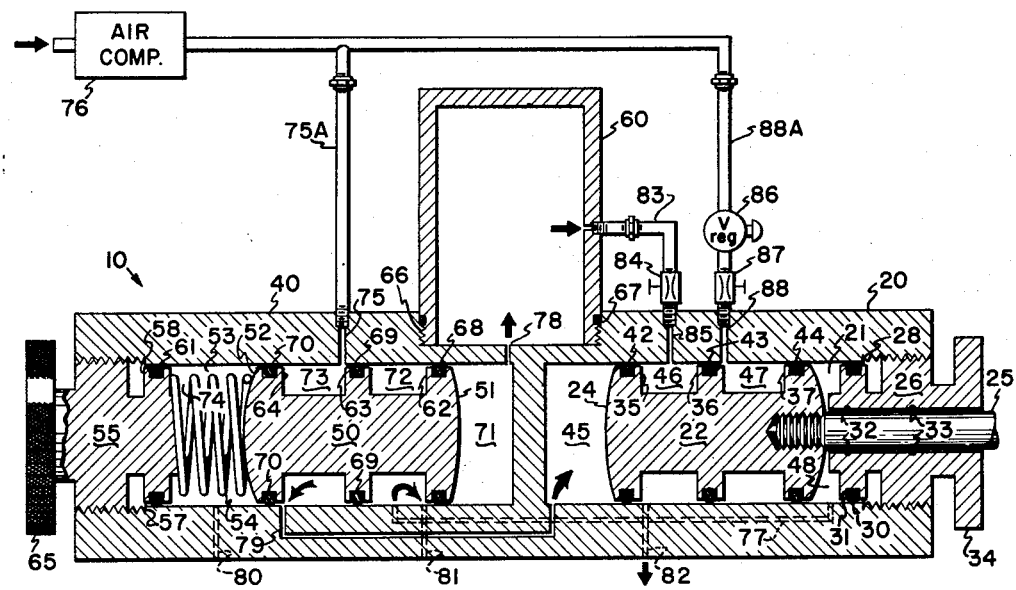
FIGURE 2 is a sectional and schematic view of an external mechanical rod action timing apparatus in combination with an external fluid power operating source, with the internal movable components of the timing apparatus in their positions at the end of the first internal cycle period of time, and showing the external operating rod in its projected or extended position.

Referring now to the drawings in detail and, in particular, to FIGURES 1 and 2 thereof, there is shown the preferred mechanical action timing apparatus 10 of this invention, which timing apparatus comprises in combination an actuator body 20 and a timing body 40 in a straight line abutting relationship. Detachably mounted in an internally threaded recess is a domed accumulator vessel 60 of predetermined volume, which vessel is closed at its upper end and provided with threads 66 at its lower end for attachment in a fluid-tight manner through an O-ring sealing gasket 67 to the internal recess. Slidably mounted for reciprocating, fluid-tight motion within a central longitudinal cavity 21 of the actuator body is a cylindrically shaped actuator piston 22 having a forward face 23 and a rear face 24. An actuator piston rod 25 is fixedly mounted in threaded engagement with the actuator piston, and projects outwardly and externally from the center forward end of the actuator piston.

Actuator piston rod 25 projects in a fluid-tight manner through the center of a stroke adjusting end piece 26, and has its forward end terminating externally of the actuator body. The projecting actuator rod by its timed reciprocating longitudinal movement simultaneously with the movement of the actuator piston has particular utility when employed in combination with other mechanically operated mechanisms such as switches, valves, cams, and the like to provide timed cyclic or alternating action. End piece 26 is in threaded attachment with actuator body 20 for longitudinal movement within a threaded internal recess having a slightly larger diameter than that of actuator body cavity 21 and an annular internal shoulder 28 at the forward end of the actuator body cavity. The stroke adjusting end piece is mounted in a movable, fluid-tight manner through an O-ring sealing gasket 30 cradled in an annular ring-like projection 31, which gasket maintains firm, fluid-tight contact at all times and positions with the internal surface of the actuator body cavity. The actuator body cavity is maintained in a fluid-tight manner, despite the reciprocating movement of the actuator piston and the external portion of its piston rod, by allowing the actuator piston rod which moves with the actuator piston to be sealed and firmly and centrally supported by O-ring sealing gaskets 32 and 33 as the rod projects through the center of the stroke adjusting end piece. The end piece 26 permits the effective length of actuator body cavity 21 and with it the amount of travel of actuator piston 22 and the external mechanical travel of actuator piston rod 25 to be readily controlled within limits by adjustment of the longitudinal position of the threaded end piece within the actuator body cavity through an external knurled adjustment knob 34, which knob is integrally mounted with end piece 26.

Surrounding the actuator piston are annular peripheral ring projections 35, 36, and 37. Cradled and supported in annular recesses in these rings respectively are O-ring sealing gaskets 42, 43, and 44, which gaskets are in firm fluid-tight contact with the internal surface of the actuator body cavity, thereby dividing this cavity into four separate fluid-tight actuator compartments. The first actuator compartment 45 comprises that space located to the rear of the rear face of the actuator piston and peripheral ring projection 35, and thus has for an effective cross section area the total area defined by the diameter of actuator body cavity 21. The second and third actuator compartments 46 and 47 are doughnut-shaped compartments comprising the spaces between the sides of the actuator piston and the ring projections on this piston, and the internal surface of the actuator body cavity. The fourth actuator compartment 48 comprises that space forward of the forward face of the actuator piston and peripheral ring projection 37. Its effective cross section area is the area defined by the diameter of actuator body cavity 21 less that defined by the diameter of actuator piston rod 25.

Considering now, in particular, timing body 40 and associated apparatus, there is shown a cylindrically shaped timing piston 50 having a forward face 51 and a rear face 52, and slidably mounted within a central longitudinal timing body cavity 53 for reciprocating, fluid-tight movement. Timing piston 50 tends to be retained in a forward, predetermined position by the force of a coiled spring 54 held in compression within the timing body cavity, this spring having one end mounted against the rear face of a rearmost annular peripheral ring projection on the timing piston. The other end of spring 54 is mounted against a pressure range adjustment end piece 55 secured in threaded engagement with the timing body in an internal recess of slightly larger diameter than timing body cavity 53, and having an annular internal shoulder 57.

End piece 55 is maintained in a fluid-tight manner with the internal surface of the timing body cavity by an annular peripheral ring projection 58 which by means of an annular recess supports and contains an O-ring sealing gasket 61. Knurled adjustment knob 65, integrally connected with and externally mounted to the pressure range adjustment end piece, permits the threaded longitudinal movement of end piece 55, and thus permits externally selected variation in the force of compressed coiled spring 54. Surrounding the timing piston are annular peripheral ring projections 62, 63, and 64. Cradled and supported in annular recesses in these rings respectively are O- sealing gaskets 68, 69, and 70, which gaskets are in firm fluid-tight contact with the internal surface of the timing body cavity, thereby dividing this cavity into four separate fluid-tight compartments.

The first timing compartment 71 comprises that space located forward of the forward face of the timing piston and peripheral ring projection 62, and thus has for an effective cross section area the total area defined by the diameter of timing body cavity 53. The second and third timing compartments 72 and 73 are doughnut-shaped compartments comprising the spaces between the sides of the timing piston and the ring projections on this piston, and the internal surface of the timing body cavity. The fourth timing compartment 74 comprises that space to the rear of the rear face of the timing piston and ring projection 64, that is, the space occupied in part by coiled spring 54. Its effective cross section area, like that of first timing compartment 71, is the area defined by the diameter of timing body cavity 53.

For purposes of the description thus far, it is within the scope of the present invention and the knowledge of a person skilled in the art that the fluid sealing means specifically represented by the several O-ring sealing gaskets may be varied in shape, size and material. Thus, for example, the O-ring sealing gaskets may be composed of leather, rubber, synthetic rubber, polyolefinic plastics like polyethylene, soft metals, and the like or any combination provided only that fluid-tight reciprocating motion is permitted of the timing and actuator pistons. Also, rather than being O-rings, the fluid sealing means may be of the split ring kind or overlapping split rings of suitable shape and size to provide a fluid seal. In some operations it is possible to use in conjunction with sealing fluids metal-to-metal fluid sealing means.

Additionally, accumulator vessel 60 has been described and illustrated as being of fixed, predetermined volume, but of course an accumulator of variable volume may be employed if desired. For example, a variable volume accumulator can be provided by employing a vessel containing an externally controlled, fluid-tight piston, thereby permitting a rapid change in effective accumulator volume by adjustment of the longitudinal position of the piston within the vessel. Further in the apparatus embodiment of this invention so far described and illustrated the accumulator vessel is mounted partly on the timing body and partly on the actuator body, but it is recognized that the accumulator vessel can be mounted entirely on either the timing body or the actuator body or even separately and apart from both of these bodies. In certain operations as later described the accumulator vessel can be eliminated altogether, although its use in most embodiments of the present invetnion is preferred. Still further the timing and actuator bodies have been shown in a straight line relationship, but these bodies may also be conveniently separated in some operations or placed in side-by-side or other relationship depending upon the needs of the particular overall combination in which the timing apparatus is to be used.

In communication at all times with third timing compartment 73 through a pressure port 75 and suitable conduit means 75A is a source of fluid at a relatively high pressure, or, specifically and preferably, a gaseous pressure source such as air compressor 76. Third timing compartment 73 and second timing compartment 72 are alternately in fluid communication with fourth actuator compartment 48 through conduit 77 known as a decreasing pressure conduit. In communication with first timing compartment 71 is a timing piston port 78 connecting the first timing compartment to the interior of accumulator vessel 60. Further, fourth timing compartment 74 and third timing compartment 73 are alternately in communication with first actuator compartment 45 through conduit 79 known as an increasing pressure conduit. In communication at all times between fourth timing compartment 74 and a region of lower pressure than the pressure maintained at pressure port 75, a region such as, for example, the atmosphere, is a rear timing body vent 80. A forward timing body vent 81 is located forward of the rear end of decreasing pressure conduit 77, which vent provides communication at all times between second timing compartment 72 and a region of relatively low pressure such as, for example, the atmosphere, and which vent is so located that in the course of reciprocating longitudinal motion of the timing piston it provides alternately first for communication between only second timing compartment 72 and the atmosphere as shown in FIGURE 1, and then for communication of decreasing pressure conduit 77 through the second timing compartment with the atmosphere as shown in FIGURE 2. An actuator body vent 82 provides communication at all times between second actuator compartment 46 and a region of relatively low-pressure such as, for example, the atmosphere.

The accumulator vessel is in communication with actuator body cavity 21 and, in particular, it communicates alternately with the second and third actuator compartments 46 and 47 through an accumulator conduit 83 having an adjustable accumulator orifice 84 such as a gas or air flow control valve or other mass fluid flow control means connected to an accumulator port 85 whereby the mass flow of fluid into and out of the accumulator port is controlled and adjusted as desired. When actuator piston 22 is in its retracted position as shown in FIGURE 1, accumulator vessel 60 is in direct communication with third actuator compartment 47, but when the actuator piston is in the forward or projected position as shown in FIGURE 2, the accumulator vessel is in communication with second actuator compartment 46 and the region of relative lower pressure through rear actuator body vent 82, while third actuator compartment 47 is out of communication with accumulator vessel 60.

In communication with third actuator compartment 47 at all times through regulated pressure port 88 and suitable conduit means 88A is a source of relatively high fluid pressure. This source can be either different from or the same as the source of relativley high pressure fluid in communication with pressure port 75, but preferably, as shown, is the same as the pressure source for port 75, in this case air compressor 76. The fluid at relatively high pressure supplied to third actuator compartment 47 is maintained at a substantially constant pressure by a pressure regulating valve 86 to provide constant operating air pressure on one side of an adjustable orifice 87 like adjustable accumulator orifice 84. From orifice 87 air at constant pressure is then introduced into third actuator compartment 47 through regulated pressure port 88. The relative positioning of accumulator port 85 and regulated pressure port 88 is predetermined to allow the movement of actuator piston 22 to first connect these ports with each other through third actuator compartment 47 in the retracted position of the piston as shown in FIGURE 1, and then in the projected position of the actuator piston as shown in FIGURE 2 to separate or disconnect these ports.

As described, the illustrated apparatus permits the slidable alternating separate longitudinal movement of both the timing and actuator pistons within their respective enclosing or surrounding bodies or containers by the employment of a single source of relatively high pressure fluid.

*Operation of the Mechanical Action Timing Apparatus*

Operation of the mechanical action timing apparatus shown in FIGURES 1 and 2 will be described on the basis of air from an air compressor being the fluid operating medium, although it is also within the scope of this invention that any liquid or gaseous fluid medium may be utilized. Thus, for example, the fluid medium depending on factors of availability and economy may be a hydraulic fluid like a liquid petroleum oil, an organic liquid compound such as an ester containing phosphorus, silicon, sulfur oxygen, nitrogen, carbon, hydrogen, halogens, or any combination and mixture thereof, water or some other liquid medium. Further, the operating medium may be a gas or vapor such as liquifiable petroleum gases like methane, ethane, pentane and mixtures thereof as found in natural gases; hydrogen, helium, oxygen, rare gases, steam, or, preferably, air.

In the operation of the apparatus shown in FIGURES 1 and 2, a source of fluid at a relatively high pressure is required with vents 80, 81, and 82 discharging to a region of relatively lower pressure which may be any pressure lower than the relatively high pressure, or even a vacuum, or preferably the atmosphere. The following operations will be described in particular with reference to air at a relatively high pressure of between 25 and 300 p.s.i.g., such as 75 to 100 p.s.i.g., with the relatively low pressure being that of the atmosphere. The operation as described will be directed toward a cycle time period of about 60 seconds, with internal time cycles of equal duration, i.e., about 30 seconds for both the retracted and projecting actuator rod positions, although it should be recognized that the total and internal cycle time periods are matters of selection, and can range from 1 second to 24 hours, or be higher or lower.

Although the movements of the timing and actuator pistons will be described on a step-by-step basis in detail, it should be borne in mind that in actual operation the movement of the actuator piston will be quite rapid when the movement of the timing piston has uncovered certain ports and conduit ends. Thus the movement time of the actuator piston to go from or to either its retracted or projected position in comparison to its dwelling or resident time in these positions will be extremely small and essentially insignificant.

Referring now in particular to FIGURE 1, on startup of the apparatus air at a constant regulated pressure of, say, 80 p.s.i.g. is introduced from air compressor 76 through conduit means 88A extending therefrom, pressure regulating valve 86, pressure orifice 87, and regulated pressure port 88 into third actuator compartment 47. The position of the third actuator compartment with actuator piston 22 in its rearward or retracted position is such that there is direct communication between this compartment and accumulator port 85; thus, air at the regulated constant pressure of 80 p.s.i.g. passes through accumulator port 85, accumulator port adjustable orifice 84, and accumulator conduit 83, and bleeds into accumulator vessel 60.

The accumulator vessel is employed for time delay purposes; that is, the accumulator vessel volume and the sizes of accumulator port adjustable orifice 84 and regulated pressure port adjustable orifice 87 control the rate at which air pressure builds up within accumulator vessel 60. From the accumulator vessel, air bleeds through timing piston port 78 into the first timing compartment. As the pressure of air increases within accumulator vessel 60 and thus in time in first timing compartment 71, this air pressure acting against the forward faces of ring projection 62 and timing piston 50 forces the timing piston to the rear overcoming the force of spring 54. The moment when the timing piston begins to move to the rear depends, of course, upon factors such as the area of forward face 51 of the piston, the rapidity and extent of the build-up of air pressure ahead of the piston, and the compressive force of the spring to be overcome. The area of the timing piston face is fixedly predetermined, while the initial compressive force exerted on spring 54 may be varied within limits by the external adjustment knob on end piece 55, i.e., moving pressure range adjustment end piece 55 forward increases the compressive force of the spring and lengthens the time required for the air pressure to overcome this force, and vice versa. The buildup of air pressure against the forward face of the timing piston is adjustable by the predetermination and preselection of the size of the accumulator vessel and the position or size of the mass flow control means, i.e., one or both of the adjustable orifices 84 and 87.

Meanwhile, on commencing operation of the apparatus, air at a pressure of between 80 and 100 p.s.i.g., say, 90 p.s.i.g., is admitted through conduit 75A and pressure port 75 into third timing compartment 73. This air flows through decreasing pressure conduit 77 to fourth actuator compartment 48. In this compartment it exerts force against forward face 23 of actuator piston 22, and drives this piston to its most rearward or retracted position as shown in FIGURE 1, so that there is communication between accumulator conduit 83 and regulated pressure port 88 through third actuator compartment 47. The pressure of air introduced into pressure port 75 need not be a constant pressure, since the only pressure required is that sufficient to give motion to the actuator piston and rod. Moderate variations in this pressure, such as 5–20 p.s.i. from 100 p.s.i.g. air compression, do not affect the timing function of the apparatus.

As timing piston 50 is driven to the rear by fluid force in first timing compartment 71 overcoming the compressive force of spring 54, O-ring gasket 69 separating the second and third timing compartments 72 and 73 passes the rear or left hand end of decreasing pressure conduit 77, thereby connecting fourth actuator compartment 48 to forward timing body vent 81 through second timing compartment 72, and permitting the relatively high pressure air in the fourth actuator compartment to bleed out through this vent as shown in FIGURE 2. As timing piston 50 continues to move to the rear further compressing spring 54, O-ring 70 separating the third and fourth timing compartments 73 and 74 passes the rear or left hand end of increasing pressure conduit 79, thereby connecting the first actuator and third timing compartments 45 and 73, and permitting the relatively high pressure air in the third timing compartment to flow rapidly into the first actuator compartment. This air acts under pressure against the rear faces of actuator piston 22 and ring projection 35, and moves the actuator piston from its retracted position shown in FIGURE 1 into its forward or projected position shown in FIGURE 2. This action thrusts the external portion of the actuator piston rod forward to accomplish the desired mechanical action. The length of permissible forward movement of the actuator piston rod is controlled, within limits, by the position of stroke adjustment end piece 26. Thus, for example, stroke adjustment end piece 25 may be either screwed in or screwed out with respect to the actuator body to shorten or lengthen the motion of actuator piston 22 and the external portion of actuator piston rod 25 which moves with the piston. As the actuator piston is moved forward, the piston rod connected to it is advanced also, thereby providing external mechanical motion for the performance of the desired timed mechanical function such as opening or closing a valve, switch, or the like.

When the actuator piston assumes its forward position, O-ring 43 separating the second and third actuator compartments 46 and 47 passes accumulator port 85, but stops short of regulated pressure port 88, thus placing these two ports out of communication with each other while simultaneously connecting first timing compartment 71 and accumulator vessel 60, now both at a relatively high pressure, to the atmosphere through accumulator conduit 83, accumulator port adjustable orifice 84, accumulator port 85, second actuator compartment 46, and actuator body vent 82. This action permits air under pressure in first timing compartment 71 and accumulator vessel 60 to bleed out of actuator body vent 82. As this bleeding causes a decrease in air pressure in the first timing compartment, the force of spring 54 returns timing piston 50 to its original starting position shown in FIGURE 1.

In the course of forward movement of the timing piston,

O-ring gasket 70 passes the rear end of increasing pressure conduit 79, thereby connecting the first actuator compartment 45, now at relatively high pressure, to the atmosphere through increasing pressure conduit 79, fourth timing compartment 74, and rear timing body vent 80. Thus as timing piston 50 moves forward the high pressure air in the first actuator compartment is allowed to bleed out of vent 80. Of course, the rear timing body vent also allows air in the fourth timing compartment 74 to be forced out to the atmosphere as timing piston 50 moves to the rear, thereby preventing the compressive force of the air from being added to the preselected spring compressive force in opposing piston movement.

Further as the timing piston moves forward towards its position shown in FIGURE 1, O-ring 69 passes the rear end of decreasing pressure conduit 77, and connects the source of relatively high pressure operating fluid at air compressor 76 to the low pressure region of fourth actuator compartment 48 through conduit 75A, pressure port 75, third timing compartment 73, and the decreasing pressure conduit, thereby causing the actuator piston to be forced back to its rearward or retracted position by the now relatively high pressure air in the fourth actuator compartment while the air under pressure in first actuator compartment 45 is being vented out through rear timing body vent 80. This action of the timing piston also places O-ring sealing gasket 69 between the rear end of decreasing pressure conduit 77 and forward timing body vent 81, thereby disconnecting this conduit and vent. Of course the rearward movement of the actuator piston retracts the actuator piston rod, thereby returning this rod to its original position shown in FIGURE 1, and effecting the desired timed mechanical result such as the opening and closing or switching of a valve as in FIGURE 3. This action then returns both the timing and actuator pistons to their starting positions, and thus completes one cyclic operation which then continues to repeat itself in the manner previously described.

In the selection of diameter of the actuator body cavity and actuator piston, recognition should be given to the threshold level of force needed to effectuate the mechanical action desired. The diameter of actuator piston 22 taken together with its ring projections should normally be preselected in conjunction with the pressure expected to be available at pressure port 75 to give the required amount of force to the actuator piston and its rod 25 as they move alternatingly between their retracted and projected or projecting positions. The diameter of timing body cavity 53 and piston 50 is not a matter of concern since any diameter sufficient to provide operation in the manner described can be employed, but when the mechanical action desired requires a certain minimum force the diameter of the actuator body cavity and piston may be of importance.

When slow or remote mechanical action is desired or when the mechanical force required is high, for example 1,000 pounds or greater, timing body 40 and actuator body 20 containing an actuator piston without an actuator rod, both bodies being of convenient size, can be positioned at a convenient remote locality. In this situation the high force mechanical action can be obtained by connecting increasing pressure conduit 79 and the decreasing pressure conduit 77 to either side of a fluid-tight container having a movable slave piston therein at a different locality. The diameter of the slave piston will be predetermined and sufficiently great to obtain the mechanical force desired. This piston will have connected thereto a rigid piston rod extending externally of the fluid container and connected with a mechanical acting valve or other device desired to be operated. As the remote actuator piston moves from a retracted to a projected position, the slave piston actuated by the change in fluid pressure in the decreasing and increasing pressure conduits will likewise move with the desired force. In this manner, the size of the actuator piston can be relatively small, with the slave piston diameter of larger preselected size.

Figure 3:
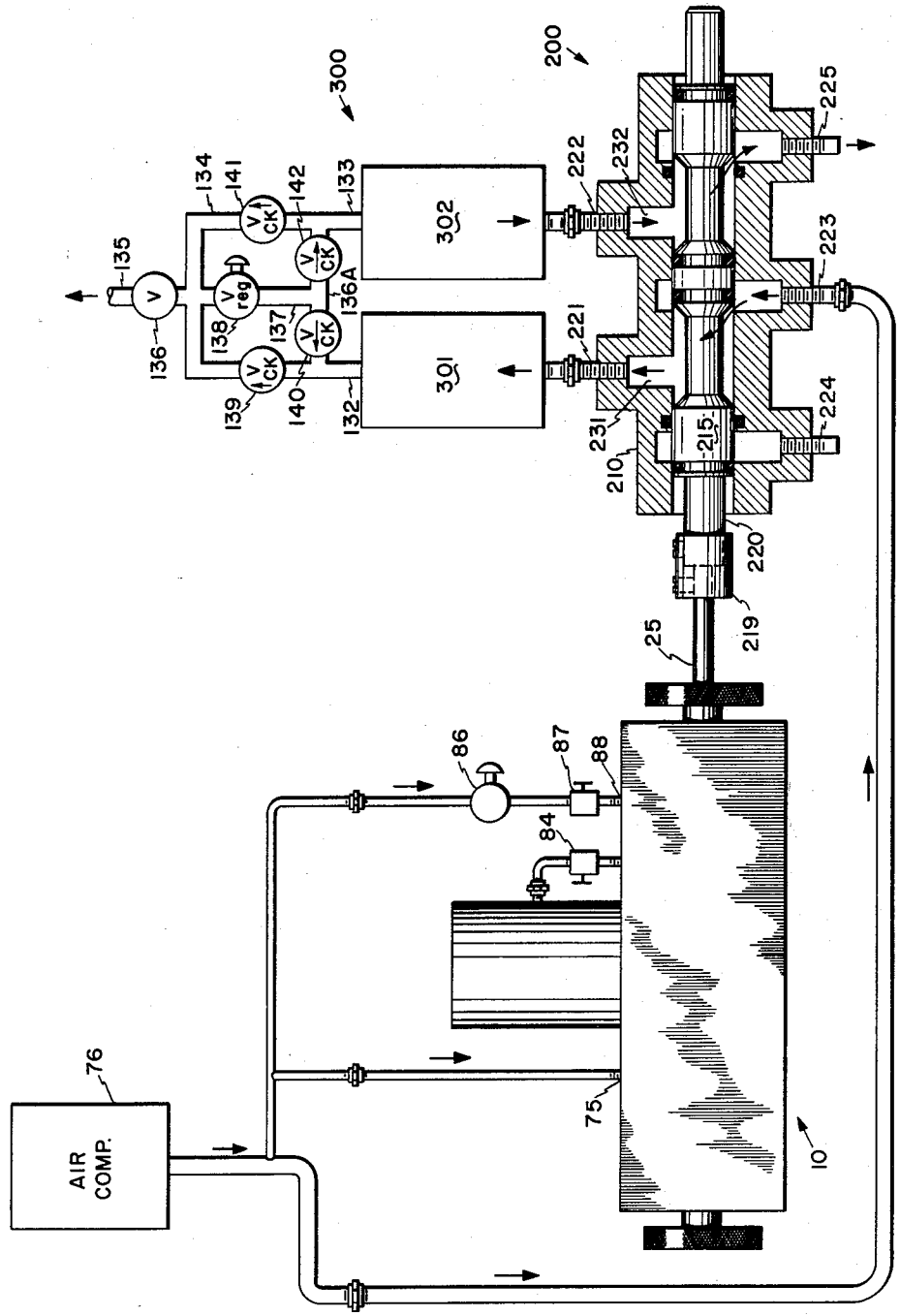
FIGURE 3 is a schematic view of the preferred mechanical action timing apparatus in operating combination with a four-way flow directing valve and a "heatless" fractionating apparatus for gaseous mixtures.

Referring next to FIGURE 3, there is shown a schematic and partially cross-sectional view of a mechanical action timing apparatus 10 in operating combination with an air compressor 76, a fractionating apparatus 300 as described in the Skarstrom patent, and a four-way five-ported fluid flow directing valve means 200. In the combination illustrated the sole source of motive power for the timing apparatus is the relatively high pressure and at least somewhat moist stream of air from compressor 76, which moist air is also the fluid medium to be fractionated, in this case to have a substantial part of its water vapor content removed. The relatively high pressure moist air from the air compressor, is supplied to pressure port 75 and regulated pressure port 88 of mechanical timing apparatus 10 in the manner first shown in FIGURE 1, and to inlet port 223 of flow directing valve means 200.

Valve means 200 shown in cross sectional view is a "spool-type" flow directing valve which comprises an external valve body 210 having mounted internally therein a double spool-type piston or plunger 215 carrying a series of circumferentially disposed fluid sealing means or O-ring sealing gaskets mounted in annular grooves. These gaskets provide fluid seals between the internal surface of valve body 210 and the spool-type piston, thereby defining within the valve body two annular doughnut-shaped compartments 231 and 232. In the flow directing valve means shown, it should be noted that none of the O-ring gaskets moves by an open port in the course of normal valve operation. The significance of this for avoidance of certain operating difficulties will become apparent in the course of description of FIGURES 4 and 5. Integrally connected with piston 215 and projecting axially and externally from valve body 210 is an operating arm 220 in line with actuator piston rod 25 of the timing apparatus, and mechanically connected thereto by an outer sleeve coupling 219.

Spool-type piston 215 is adapted for slidable, reciprocating, fluid-tight longitudinal movement within valve body 210, and is responsive to the action of the mechanically coupled actuator piston rod as this rod alternately and cyclically assumes retracted and projected positions as previously described. The motion of piston 215 directs the working fluid or moist air incoming to valve means 200 from compressor 76 to a series of ports in communication with compartments 231 and 232, and thereby effects flow directing action by the particular dwell positions of the spool-type piston. Providing fluid communication to and from the interior valve body 210 are a series of ports as follows: first vessel port 221, second vessel port 222, inlet port 223, first exhaust port 224, and second exhaust port 225.

Fractionating apparatus 300 as shown comprises a first adsorption vessel 301 and a second adsorption vessel 302, each of which contains a bed of solid subdivided adsorbent material having a selected affinity for one or more key components of the relatively high pressure stream of gaseous mixture material supplied to valve inlet port 223 as a feed stream for fractionation. In this case the feed stream is moist air, with the adsorbent material (such as 4 x 12 mesh 4X molecular sieves) having a selected affinity for water vapor. Vessels 301 and 302 have first and second gross primary effluent conduits 132 and 133 extending upwardly from them respectively. These conduits are connected to a common discharge manifold conduit 134 which is connected in turn to a common net primary effluent discharge conduit 135 containing an adjustable control valve 136. Connecting the first and second gross primary effluent conduits is a divided conduit 136A joined part way along its length with a reflux conduit 137 in which is disposed a pressure reducing control valve 138. The members 139, 140, 141, and 142 designate check valves in the just-described conduit system adapted to permit fluid flows only in the directions shown.

The lower portions of vessels 301 and 302 and the adsorbent beds within them are in direct fluid communication through suitable conduit means with first and second vessel ports 221 and 222 respectively of valve body 210, with first and second exhaust ports 224 and 225 of the valve body being in communication with a region of relative low pressure, in this case the atmosphere. Fractionating apparatus 300 is essentially the apparatus illustrated in FIGURE 1 of the Skarstrom patent of which apparatus according to the method recited in this patent each vessel is alternately and cyclically placed on a relatively high pressure or adsorption cycle while the other vessel is on a relatively low pressure or desorption cycle, thereby fractionating the gaseous mixture feed stream into a net primary effluent stream and a gross secondary effluent stream, respectively containing the key component material in a less and greater concentration than that in which it is present in the feed stream.

In the operation of the described apparatus combination of FIGURE 3, high pressure moist air from air compressor 76 is supplied to mechanical action timing apparatus 10 whereby actuator piston rod 25 is alternately and cyclically placed in retracted and projected or forward positions for preselected periods of dwell time, for example, 30 seconds in each position. The motion of the actuator piston rod effects motion of spool-type piston 215 of valve means 200, and when piston rod 25 is in its projected position as shown in FIGURE 3 spool-type piston 215 is positioned to allow moist air from the air compressor constituting the gaseous mixture feed stream to enter the lower portion of first adsorption vessel 301, thereby placing this vessel on a high pressure or adsorption cycle. At the same time, as shown in FIGURE 3, second adsorption vessel 302 previously on a high pressure or adsorption cycle is put in communication with the atmosphere through second exhaust port 225, and is thereby placed on a low pressure or desorption cycle.

As illustrated, moist air introduced into inlet port 223 is permitted by the particularly shown position of valve piston 215 to pass about this piston through compartment 231, then through first vessel port 221, and finally be introduced into the lower portion of first adsorption vessel 301. Simultaneously, the feed stream of moist air is blocked by valve piston 215 and at least one of its O-ring sealing gaskets from entering the lower portion of second adsorption vessel 302 while this vessel is in communication with the atmosphere through second vessel port 222, compartment 232, and second exhaust port 225. When actuator piston rod 25 moves to its retracted position, the position of spool-type piston 215 is altered to the left, and the air flow switched to place adsorption vessels 301 and 302 on low and high pressure or desorption and adsorption cycles respectively. In this manner, the moist air at relatively high pressure is introduced alternately and cyclically into each vessel of the two-vessel fractionating apparatus, and a continuous net primary effluent stream of dry air is discharged from conduit 135, while the gross secondary effluent stream comprising moist air at a relatively low pressure and with a greater water vapor content than the moist air of the feed stream is alternately and cyclically discharged to the atmosphere through the first and second exhaust ports 224 and 225 of flow directing valve means 200. The term "net primary effluent" refers to the gross primary effluent discharged from the adsorption vessel on a high pressure or adsorption cycle less the reflux portion thereof used to backwash the bed of adsorbent material in the vessel on a low pressure or desorption cycle, while the term "gross secondary effluent" refers to the reflux material plus the previously adsorbed key component material desorbed and discharged from the bed of adsorbent material in the vessel on a low pressure or desorption cycle.

It will be seen that the apparatus combination shown in FIGURE 3 provides altogether suitably for the cyclical, timed introduction into and discharge from fractionating apparatus 300 of the same fluid medium, i.e., air, which is employed to operate mechanical action timing apparatus 10. The unique advantages and economy of operation of such a combination will be readily apparent to a person skilled in the art. As described and illustrated, a two-vessel fractionating apparatus is employed, and indeed is preferred. It is to be recognized, however, that this general combination will also be operative with a fractionating apparatus having either only one or more than two adsorption vessels. Additionally, the particular flow directing valve means described, and taking the place of the two 3-way rotating plug type valves shown in the Skarstrom patent, has been employed in order to show the use of a timing apparatus having an actuator piston rod connected directly to the moving valve port. However, timing apparatus 10 could obviously be connected indirectly, as by a yoke, to the actuating levers or linkages of the two 3-way valves shown in the Skarstrom patent to provide proper operation of both of these valves. Further, two or more mechanical action timing apparatuses can be employed as desired, and operated with the same or a different fluid medium from the material to be fractionated. Further still, although the fluid fractionated according to the description of FIGURE 3 was moist air, the unique apparatus combination illustrated in this figure may, of course, be employed for the fractionation of a variety of gaseous mixtures.

*Timing Adjustments*

As described, the total external cycle time of the apparatus of FIGURES 1 and 2 is that period of time that it takes from the start of motion for the actuator piston and piston rod to move from their retracted position in the actuator body to their projected or forward position therein and therebeyond; remain in this position for a while; return to their initial retracted position, and remain there until the start of another forward movement. This total cycle time can be divided into two internal or individual time periods, a retracted time period and a forward or projected time period. The retracted time period corresponds substantially to that period of dwell time during which the actuator piston and piston rod are in their most rearward or retracted position shown in FIGURE 1, while the forward time period corresponds substantially to that period of dwell time during which the actuator piston and piston rod are in their most forward or projected position shown in FIGURE 2, the times of actual movement of the actuator piston back and forth between forward and retracted positions being considered negligible.

The retracted and forward time periods of the actuator piston and piston rod can be described in terms of the motion of timing piston 50. On this basis, the retracted time period extends substantially from the time when O-ring 69 passes the left hand end of decreasing pressure conduit 77 as the timing piston moves rightwardly or forwardly to the time when O-ring 70 passes the left hand end of increasing pressure conduit 79 as the timing piston moves leftwardly or rearwardly. On the same basis, the foward or projected time period extends substantially from the time when O-ring 70 passes the left hand end of increasing pressure conduit 79 as the timing piston moves leftwardly or rearwardly to the time when O-ring 69 passes the left hand end of decreasing pressure conduit 77 as the timing piston moves rightwardly or forwardly.

The total external cycle time as defined can be adjusted by several methods and means which have for their purpose increasing or decreasing as desired the delay time needed for accumulator vessel 60 and first timing compartment 71 to acquire sufficient internal pressure to overcome the force of compression spring 54 and start the motion of timing piston 50 leftwardly, or, conversely, when the accumulator vessel and first timing compartment are fully pressurized the delay time needed for them to relieve their pressure through actuator body vent 82 until the fluid medium force or gas force exerted against the front face or front end of the timing piston has fallen below the spring force exerted against its rear end allowing spring 54 to start to move timing piston 50 rightwardly. One method or means of accomplishing this is to employ an accumulator vessel of widely variable volume or a succession of accumulator vessels of various volumes as needed, but this is not the most suitable means or method unless the change in total cycle time desired is rather great, for example, from 30 seconds to 10 minutes. The preferred method is to adjust the rate of mass flow of the working fluid, preferably air, into and out of accumulator vessel 60 and first timing compartment 71 by the use of adjustable accumulator orifice 84.

By closing the adjustable accumulator orifice, i.e., decreasing the size of its orifice opening, the mass flow rate of fluid medium or working fluid medium or working fluid into the accumulator vessel and the first timing compartment from relatively high pressure source 76 as in FIGURE 1 is reduced, and the delay time for accumulator vessel 60 and first timing compartment 71 to reach a sufficiently high pressure to acutate the timing piston in rearward movement is increased, thus increasing the dwell time of the actuator piston and piston rod in their retracted position. Opening adjustable accumulator orifice 84 has the opposite effect. Also, by the action of closing adjustable accumulator orifice 84 the mass flow rate of the fluid medium out of accumulator vessel 60 and first timing compartment 71 through actuator body vent 82 as in FIGURE 2 is reduced, and the delay time for the accumulator vessel and the first timing compartment to reach a sufficiently low pressure to permit spring 54 to actuate the timing piston in forward movement is increased, thus increasing the dwell time of the actuator piston and piston rod in their projected or forward position. Opening adjustable accumulator orifice 84 has the opposite effect. It will be seen, therefore, that adjustment of orifice 84 can be used to control that total cyclic time period by either increasing or decreasing both the dwell times or internal or individual cycle time periods together.

Note is to be taken that upon the charging of accumulator vessel 60 the working fluid medium at relatively high pressure, such as air from compressor 76, flows in through both adjustable pressure orifice 87 and adjustable accumulator orifice 84. Upon the discharging of the accumulator vessel, however, the fluid medium flows out through adjustable accumulator orifice 84 but not through adjustable pressure orifice 87. Accordingly, adjustment of orifice 87 will have an effect upon only the charging time of the accumulator vessel, not its discharging time. Said in other words, adjustment of orifice 87 will have an effect upon only the dwell time of the actuator piston and piston rod in their retracted position, not their dwell time in their forward or projected position. Closing adjustable pressure orifice 87 increases the retracted dwell time of the actuator piston and piston rod while opening it decreases this dwell time.

Independent setting of the dwell times of the actuator piston and piston rod in their retracted and forward positions can be achieved by adjusting both orifices 84 and 87. With an initial arbitrary or intermediate adjustment of pressure orifice 87, accumulator orifice 84 is adjusted as necessary to give the desired forward dwell time of the accumulator piston and piston rod. Of course this adjustment will also provide some particular retracted dwell time of the actuator piston and piston rod, but not necessarily the desired one, and indeed probably not the desired one. The desired retracted dwell time is obtained by adjusting pressure orifice 87 as necessary. Fluid pressure on the upstream side of the adjustable pressure orifice is maintained substantially constant by pressure regulating valve 86. Thus a given combination of adjustments of orifices 84 and 87 will provide repeatable values of the dwell times of actuator piston 22 and its piston rod 25 in their retracted and forward positions assuming, of course, that the region of relatively low pressure with which actuator body vent 82 communicates is also a region of relatively constant pressure.

It is possible, as a matter of fact, that a mechanical action timing apparatus could be built and operated without either or both of the adjustable orifices 84 and 87, or, equivalently, with one orifice adjustable and the other fixed, or with both fixed. From the foregoing description it will be clear what the impairment of utility of the timing apparatus would be in respect of loss of adjustability of either or both total and individual cycle times for any particular one of these design modifications. In the design of any given apparatus embodiment of timing apparatus 10 as shown, that is, the apparatus having both adjustable orifices 84 and 87, proper consideration must, of course, be given to conditions of flow of the fluid operating medium through the orifices and ports of the apparatus, especially to any conditions of critical flow which might affect the stability or desired range of adjustment of the total and individual cycle times.

In an apparatus in which the diameter of the timing piston is relatively large and for which the total timing cycle period is required to be relatively short, e.g., 1 to 30 seconds, it is possible for the timing apparatus to function without an external accumulator vessel. In this case the necessary time delays of pressurizing and discharging can be obtained by utilizing the volume of first timing compartment 71 only, and so accumulator conduit 83 is brought directly to timing piston port 78 while accumulator vessel 60 is removed entirely. In apparatuses in which smaller diameter timing pistons are employed and for which longer total timing cycle periods are required, however, it is preferred that external accumulator vessels be utilized. One of the difficulties associated with use of the first timing compartment as an accumulator arises out of the need to reduce the timing piston port diameter. Such reduction increases the danger of having this port become plugged by dirt, heavy oil, rust particles, or other solid or liquid contaminants in the fluid operating medium. For example, where the timing piston port of an apparatus having an external accumulator vessel is about 0.010 to 0.020 inch in diameter for a delay period of 30 seconds, the same delay period for this apparatus used without an external accumulator vessel would require that the apparatus have a timing piston port of only about 0.001 to 0.005 inch diameter. A port of this small size would be quite susceptible to plugging.

Another suitable method of adjusting at least one of the internal or individual cycle time periods as well as the total timing cycle of the apparatus is by controlling the longitudinal position of pressure range adjustment end piece 55. Forward adjustment of this end piece by means of its external knob 62 increases the force exerted by spring 54 against rear face 52 of timing piston 50, and thereby increases the fluid operating medium force and consequently the pressure accumulation time required to overcome the spring force. Thus by increasing the initial spring compression the dwell or residence time of the actuator piston and piston rod in their retracted position may be increased. Conversely, where there is an initial preset force of spring 54 against the timing piston, rearward adjustment of pressure range adjustment end piece 55 decreases the dwell time of the actuator piston and piston rod in their retracted position.

All of the adjusting methods described can, of course, be used either separately or in combination to obtain the desired effect on both the total and individual cycle time periods. Another method would involve the structural alteration of substituting a pneumatic resilient or biasing means for coil spring 54, and call for variation of the initial condition of pressurization of this means. Said in other words and for example, rear timing body vent 80 could be plugged to trap a body of air in fourth timing compartment 74 to serve as a pneumatic spring, and the initial compression of this spring varied according to the longitudinal position of end piece 55. Additionally, the same effect could be achieved without adjustment of end piece 55 by connecting vent 80 to a source of air pressure capable of being regulated. The peak value of this regulated pressure would, of course, have to be less than the pressure available from air compressor 76 in order that leftward or rearward motion of timing piston 50 still be possible.

*Internal Fluid Flow Directing Timing Apparatus*

Referring finally to FIGURES 4 and 5, there is shown an internal fluid flow directing timing apparatus 100 which is basically similar to the mechanical action timing apparatus described already. Considering particularly the modifications of the earlier-described apparatus as they appear in FIGURES 4 and 5, it will be seen that actuator piston 110, slidably mounted for reciprocating, fluid-tight motion within a central longitudinal cavity of actuator body 112, is provided with additional annular peripheral ring projections 113, 114, and 115. Cradled and supported in annular recesses in these three ring projections respectively are O-ring sealing gaskets 117, 118, and 119 which are in firm, fluid-tight contact with the internal surface of the actuator body cavity. In this manner the actuator body cavity is divided up into three additional fluid-tight, doughnut-shaped compartments. Two of these additional compartments are first and second exhaust compartments 122 and 124 which are in separate communication at all times with a region of relatively low pressure, for example, the atmosphere, through first and second exhaust vents 125 and 126 respectively. The third additional compartment is fluid feed stream directing compartment 123 which is in communication at all times with a feed port 127. In the embodiment shown, this feed port in turn is in communication by means of conduit 127A with a source of relatively high pressure fluid such as an air compressor 76 which also supplies the fluid medium or air to operate the timing apparatus. In this embodiment air constitutes both the fluid operating medium of the timing apparatus and the fluid to be directed by the internal fluid flow directing means.

First and second exhaust compartments 122 and 124 are alternately in communication through first and second inlet-outlet flow directing ports 128 and 129 with first and second adsorption vessels 130 and 131 respectively. It is these vessels into which it is desired to introduce alternately a relatively high pressure stream of moist air in a preselected timed manner according to the teachings of the Skarstrom patent. Thus these vessels contain beds of an adsorbent material having a selective affinity for one or more components of the gaseous mixture feed stream, such as in this case the water vapor content of the moist air discharged from compressor 76.

As described herein, the internal fluid flow directing timing appartaus of FIGURES 4 and 5 is in combination and fluid flow communication with a "heatless" fractionating apparatus. It is to be recognized, of course, that flow directing means of the general kind described can be employed to alternately direct any types of fluids, gaseous or liquid, into any sort or number of separate vessels, pipelines, containers, tanks, and the like either in a pulsating introductory flow manner only or, as described, in connection with an alternating discharge or exhaust operation. The number of separate mixture components together with the number of fluid feed streams and vessels to be employed controls the number of actuator piston compartments required. In the apparatus illustrated in FIGURES 4 and 5, actuator piston 110 does not have connected to it an actuator piston rod projecting externally from this timing apparatus. A stroke adjusting end piece 151, with a knurled adjustment knob 152, is provided in order to permit minor adjustments to be made in the extreme forward position of the actuator piston, for example, to obtain the proper positioning of the actuator piston O-rings along the actuator body cavity internal surface. Additionally, of course, the flow directing timing apparatus can be provided with an actuator piston rod, if desired, and thus be capable of furnishing both external mechanical action and internal fluid flow direction.

The operation of the timing apparatus portion of the whole apparatus of FIGURES 4 and 5 is as previously described in connection with FIGURES 1 and 2. FIGURE 4 shows the actuator piston in its retracted position permitting relatively high pressure moist air from air compressor 76 to enter feed port 127; flow through feed stream directing compartment 123 and first inlet-outlet flow directing port 128, and be introduced into the lower portion of first adsorption vessel 130, thereby placing this vessel on a high pressure or adsorption cycle. At this time second adsorption vessel 131 previously on a high pressure or adsorption cycle is or is placed on a low pressure or desorption cycle by being or being put in communication with the atmosphere through second inlet-outlet flow directing port 129, second exhaust compartment 124, and second exhaust vent 126, thereby permitting the discharge from vessel 131 of a gross secondary effluent stream. The net primary effluent stream, i.e., the desired dry product air, flows out through the high pressure discharge conduit of the Skarstrom apparatus as shown.

When timing piston 50 is forced rearwardly by increasing air pressure within accumulator vessel 60 and first timing compartment 71, actuator piston 110 is moved forwardly to its position shown in FIGURE 5. In this position of the actuator piston the flow of relatively high pressure moist air into first adsorption vessel 130 is stopped by the positioning of O-ring 118 between first inlet-outlet flow directing port 128 and feed port 127, and correspondingly the first adsorption vessel is shifted onto a low pressure or desorption cycle by being put in communication with the atmosphere through first inlet-outlet flow directing port 128, first exhaust compartment 122, and first exhaust vent 125. At the same time flow of relatively high pressure moist air is commenced into the lower portion of second adsorption vessel 131 placing this vessel, previously on a low pressure or desorption cycle, onto a high pressure or adsorption cycle. In this manner the air is alternately and cyclically introduced into and discharged from the first and second adsorption vessels in a preselected timed manner to cause the fractionation of the feed stream of relatively high pressure moist air into streams of dry air and air of increased moisture content according to the "heatless" fractionation method. The adsorbent material of the beds within vessels 130 and 131 may be any subdivided solid material haivng a selective affinity for water vapor, for example, a material such as 8 x 12 mesh 4× molecular sieves, charcoal, silica gel, etc.

*Utilization of Apparatus*

The mechanical action timing apparatus of this invention shown in FIGURES 1 and 2 had particular utility as shown in FIGURE 3 in combination with those adsorptive-type fractionating apparatuses rated for relatively large gas flows such as 50 standard cubic feet per minute (50 s.c.f.m.) or higher. The internal fluid flow directing timing apparatus shown in FIGURES 4 and 5 is of general utility in combination with fractionating apparatuses rated for somewhat smaller gas flows, especially relatively low gas flows in the range from about ½ s.c.f.m. to about 10 s.c.f.m. For high-flow fractionating apparatuses, the mechanical action timing apparatus will operate the flow switching valves or flow directing means by shifting the valves through the movement of its actuator piston rod. Mechanical shifting action is preferred for the flow switching valve means of high-flow fractionating apparatuses because the inlet-outlet flow directing ports 128 and 129 of a timing apparatus 100 according to FIGURES 4 and 5 used with such a fractionating apparatus would of necessity be fairly large, for example over ½ inch or over 1 inch in diameter to avoid excessive pressure drop of fluids flowing through them. However, the use of such large diameter ports will not be entirely acceptable in all cases on account of the tendency of O-ring sealing gaskets 117 and 118 to be extruded into the ports. Therefore, where inlet-outlet ports of the larger size would be required external operation of the flow directing valve means is preferred, while where these ports can properly be less than ¼ inch or less than ⅛ inch in diameter with low-flow fractionating apparatuses the timing apparatus of FIGURES 4 and 5 with internal fluid flow directing means is preferred. Although both timing apparatuses described are particularly suitable to provide total cycle times of 30 seconds to 60 minutes, e.g., 1 minute to 20 minutes, longer or shorter total cycle times are possible as well as equal or unequal periods of forward and retracted actuator piston dwell.

Conclusion

The present invention has been described and illustrated in and with certain preferred but nonlimiting specific apparatus embodiments and modes of operation, and at least some modifications of it in detail within the capabilities of a person skilled in the art upon his consideration of this disclosure are contemplated. It is intended to secure protection by Letters Patent of all these modifications within the spirit and scope of the appended claims to the broadest extent that the prior art permits.

I claim as my invention:
1. A mechanical action timing apparatus comprising in combination
  (1) an accumulator vessel;
  (2) a timing body having a forward end and a rear end and having disposed therein for reciprocating motion a timing piston having a rear face and a forward face which piston divides the timing body into at least four fluid tight compartments as follows:
    (a) a first timing compartment having the forward face of the piston as one side thereof and the forward end of the timing body as the opposite side thereof and being in fluid communication through a timing port with the accumulator vessel,
    (b) a second timing compartment in fluid communication through a forward discharge vent with a region of relatively low pressure,
    (c) a third timing compartment capable of being placed in fluid communication with a relatively high pressure source through a pressure port, and
    (d) a fourth timing compartment having the rear end of the timing piston as one side thereof, and the rear end of the timing body as the opposite side thereof and having disposed therein a resilient means to return the timing piston to a forward position;
  (3) an actuator body having a forward end and a rear end and having disposed therein for reciprocating motion an actuator piston having a rear face and a forward face and having an actuator piston rod integrally mounted with said piston for movement therewith, said rod projecting in a fluid tight manner externally of the timing body, which piston divides the actuator body into at least four fluid tight compartments as follows:
    (a) a first actuator compartment having the rear face of the actuator piston as one side thereof and the rear end of the actuator body as the opposite side thereof,
    (b) a second actuator compartment in fluid communication through an actuator discharge vent with a region of relatively low pressure,
    (c) a third actuator compartment capable of being placed in fluid communication through a regulated pressure port with a source of relatively constant pressure, and
    (d) a fourth actuator compartment having the forward face of the actuator piston as one side thereof and the forward end of the actuator body as the opposite side thereof;
  (4) a decreasing pressure conduit in fluid communication at one end with the fourth actuator compartment and being so disposed that it is in alternate fluid communication at another end with the third and second timing compartments by the reciprocating motion of the timing piston;
  (5) an increasing pressure conduit in fluid communication at one end with the first actuator compartment and being so disposed that it is in alternate fluid communication at another end with the fourth and third timing compartments by reciprocating motion of the timing piston, and
  (6) an accumulator conduit in fluid communication at one end with the accumulator vessel and being so disposed to be in alternate fluid communication at another end with the third and second actuator compartments by the reciprocating motion of the actuator piston.

2. A timing apparatus as defined in claim 1 wherein said accumulator conduit contains fluid flow control means.

3. A timing apparatus as defined in claim 1 which includes fluid flow control means in fluid communication with the regulated pressure port.

4. A timing apparatus as defined in claim 1 which body includes actuator piston stroke adjustment means to control the longitudinal travel of the actuator piston rod.

5. A timing apparatus as defined in claim 1 which includes adjustment means whereby the force exerted by the resilient means on the timing piston may be regulated.

6. A timing apparatus as defined in claim 1 wherein the timing and actuator pistons are cylindrically shaped bodies having circumferential fluid sealing means.

7. A timing apparatus as defined in claim 1 wherein said resilient means is a spring means.

8. A timing apparatus as defined in claim 1 in which the timing body has a rear discharge vent through which said fourth timing compartment is in fluid communication with a region of relatively low pressure.

9. A timing apparatus as defined in claim 1 in combination with a source of relatively high pressure fluid, said source being in fluid communication with (a) the pressure port in said timing body, and (b) the regulated pressure port in said actuator body.

10. An apparatus combination according to claim 9 in which said source is in fluid communication with said regulated pressure port through pressure regulating means.

11. An apparatus combination as defined by claim 9 wherein said fluid pressure source is an air pressure source.

12. An apparatus combination as defined by claim 9 wherein said actuator piston rod is operatively connected to external fluid flow directing means.

13. A timing apparatus as defined by claim 1 in combination with
  (1) a source of a relatively high pressure gaseous feed stream containing at least one key component;
  (2) a gas fractionating means adapted to fractionate said feed stream into one stream containing the key component in a decreased concentration and another stream containing the key component in an increased concentration by the alternating and cyclic introduction of the feed stream into and its discharge from a vessel containing a bed of adsorbent material; and (3) a gas flow directing means connected to the actuator piston rod of said timing apparatus and adapted to permit the alternating and cyclic introduction of the gaseous feed stream into and its discharge from said vessel in response to the movement of the actuator piston rod; said source being also in fluid communication with the pressure port and the regulated pressure port of the timing apparatus.

14. A mechanical action timing apparatus comprising in combination
(1) a removable accumulator vessel of predetermined volume;
(2) a timing body having a forward end and a rear end and characterized by a cavity and having disposed therein for slidable reciprocating motion a cylindrically shaped timing piston having a rear face and a forward face and circumferential fluid sealing means, which piston divides the timing body cavity into at least four fluid tight compartments as follows:
 (a) a first timing compartment having the forward face of the piston as one side thereof and the forward end of the timing body as the opposite side thereof and being in fluid communication through a timing port with the accumulator vessel,
 (b) a second timing compartment in fluid communication through a forward discharge vent with a region of relatively low pressure,
 (c) a third timing compartment capable of being placed in fluid communication with a relatively high pressure source through a pressure port, and
 (d) a fourth timing compartment having the rear end of the timing piston as one side thereof, and the rear end of the timing body as the opposite side thereof and having disposed therein a coiled spring tending to return the timing piston to a forward position and being in fluid communication through a rear discharge vent with a region of relatively low pressure;
(3) an actuator body having a forward end and a rear end and characterized by a cavity and having disposed therein for slidable reciprocating motion a cylindrically shaped actuator piston having a rear face and a forward face and circumferential fluid sealing means and having further an actuator piston rod integrally and centrally mounted with said piston for movement therewith, said rod projecting in a slidable fluid-tight manner externally of the timing body, which piston divides the actuator body cavity into at least four fluid-tight compartments as follows:
 (a) a first actuator compartment having the rear face of the actuator piston as one side thereof and the rear end of the actuator body as the opposite side thereof,
 (b) a second actuator compartment in fluid communication through an actuator discharge vent with a region of relatively low pressure,
 (c) a third actuator compartment capable of being placed in fluid communication through a regulated pressure port with a source of relatively constant pressure, and
 (d) a fourth actuator compartment having the forward face of the actuator piston as one side thereof and the forward end of the actuator body as the opposite side thereof;
(4) a decreasing pressure conduit in fluid communication at one end with the fourth actuator compartment and being so disposed that it is in alternate fluid communication at another end with the third and second timing compartments by the reciprocating motion of the timing piston;
(5) an increasing pressure conduit in fluid communication at one end with the first actuator compartment and being so disposed that it is in alternate fluid communication at another end with the fourth and third timing compartments by reciprocating motion of the timing piston; and
(6) an accumulator conduit in fluid communication at one end with the accumulator vessel and being so disposed to be in alternate fluid communication at another end with the third and second actuator compartments by the reciprocating motion of the actuator piston and containing adjustable fluid flow control means.

15. A timing apparatus as defined in claim 14 which includes actuator piston stroke adjustment means to concommunication with the regulated pressure port.

16. A timing apparatus as defined in claim 14 which includes actuator piston stroke adjustment means to control the longitudinal travel of the actuator piston rod.

17. A timing apparatus as defined in claim 14 which includes adjustment means whereby the force exerted by the coiled spring on the timing piston may be regulated.

18. A timing apparatus as defined in claim 14 in combination with a source of relatively high pressure air, said source being in air communication with (a) the pressure port in said timing body, and (b) the regulated pressure port in said actuator body.

19. An apparatus combination according to claim 18 in which said source is in air communication with said regulated pressure port through pressure regulating means.

20. An apparatus combination as defined by claim 18 wherein said actuator piston rod is operatively connected to external gas flow directing means.

21. A flow directing timing apparatus comprising in combination
(1) an accumulator vessel;
(2) a timing body having a forward end and a rear end, and having disposed therein for reciprocating motion a timing piston having a rear face and a forward face which piston divides the timing body into at least four fluid-tight compartments as follows:
 (a) a first timing compartment having the forward face of the piston as one side thereof and the forward end of the timing body as the opposite side thereof and being in fluid communication through a timing port with the accumulator vessel,
 (b) a second timing compartment in fluid communication through a forward discharge vent with a region of relatively low pressure,
 (c) a third timing compartment capable of being placed in fluid communication with a relatively high pressure source through a pressure port, and
 (d) a fourth timing compartment having the rear end of the timing piston as one side thereof and the rear end of the timing body as the opposite side thereof, and having disposed therein a resilient means to return the timing piston to a forward position;
(3) an actuator body having a forward end and a rear end, and having disposed therein for reciprocating motion an actuator piston having a rear face and a forward face, which piston divides the actuator body into at least seven fluid-tight compartments as follows:
 (a) a first actuator compartment having the rear face of the actuator piston as one side thereof and the rear end of the actuator body as the opposite side thereof,
 (b) a second actuator compartment in fluid communication through an actuator discharge vent with a region of relatively low pressure,
 (c) a third actuator compartment capable of being placed in fluid communication through a regulated pressure port with a source of relatively constant pressure,
- (d) a first exhaust compartment having a first inlet-outlet port and in fluid communication through a first exhaust vent with a region of relatively low pressure,
- (e) a feed stream compartment in fluid communication with a feed stream port and in alternate fluid communication with first and second inlet-outlet ports by the reciprocating motion of the actuator piston;
- (f) a second exhaust compartment having a second inlet-outlet port and in fluid communication through a second exhaust vent with a region of relatively low pressure, and
- (g) a fourth actuator compartment having the forward face of the actuator piston as one side thereof and the forward end of the actuator body as the opposite side thereof;

(4) a decreasing pressure conduit in fluid communication at one end with the fourth actuator compartment and being so disposed that it is in alternate fluid communication at another end with the third and second timing compartments by the reciprocating motion of the timing piston;

(5) an increasing pressure conduit in fluid communication at one end with the first actuator compartment and being so disposed that it is in alternate fluid communication at another end with the fourth and third timing compartments by reciprocating motion of the timing piston; and (6) an accumulator conduit in fluid communication at one end with the accumulator vessel and being so disposed to be in alternate fluid communication at another end with the third and second actuator compartments by the reciprocating motion of the actuator piston.

22. A flow directing timing appartus as defined in claim 21 in combination with
  (1) a source of a relatively high pressure gaseous feed stream containing at least one key component, said source being in gaseous communication with
    (a) the pressure port,
    (b) the regulated pressure port through a pressure regulating means, and
    (c) the feed stream port; and
  (2) a fractionating apparatus comprising a first and a second vessel, each vessel containing a bed of adsorbent material having a selected affinity for said key component and said first and second vessels being in respective gas communication with the first and second inlet-outlet ports.

References Cited in the file of this patent

UNITED STATES PATENTS

| | | |
|---|---|---|
| 1,887,589 | Farmer | Nov. 15, 1932 |
| 1,887,606 | Thomas | Nov. 15, 1932 |
| 2,070,720 | Ernest | Feb. 16, 1937 |
| 2,093,805 | Baufre | Sept. 21, 1937 |
| 2,380,315 | Kilian | July 10, 1945 |
| 2,541,409 | Cornelius | Feb. 13, 1951 |
| 2,651,061 | Polleys | Sept. 8, 1953 |
| 2,768,703 | Parks | Oct. 30, 1956 |
| 2,796,177 | Kryzer | June 18, 1957 |

UNITED STATES PATENT OFFICE
CERTIFICATE OF CORRECTION

Patent No. 3,160,486              December 8, 1964

Adolphus L. Busch, Jr.

It is hereby certified that error appears in the above numbered patent requiring correction and that the said Letters Patent should read as corrected below.

Column 20, lines 12 to 14, strike out "A timing apparatus as defined in claim 14 which includes actuator piston stroke adjustment means to concommunication with the regulated pressure port." and insert instead -- A timing apparatus as defined in claim 14 which includes adjustable fluid flow control means in fluid communication with the regulated pressure port. --.

Signed and sealed this 13th day of April 1965.

(SEAL)
Attest:

ERNEST W. SWIDER             EDWARD J. BRENNER
Attesting Officer              Commissioner of Patents